US012254997B2

(12) United States Patent
Matthews et al.

(10) Patent No.: US 12,254,997 B2
(45) Date of Patent: Mar. 18, 2025

(54) FUEL FABRICATION PROCESS FOR RADIOISOTOPE THERMOELECTRIC GENERATORS

(71) Applicant: Zeno Power Systems, Inc., Alexandria, VA (US)

(72) Inventors: Jacob Matthews, Alexandria, VA (US); Christofer Erin Whiting, Washington Township, OH (US); Chadwick Douglas Barklay, Dayton, OH (US)

(73) Assignee: Zeno Power Systems, Inc., Alexandria, VA (US)

( * ) Notice: Subject to any disclaimer, the term of this patent is extended or adjusted under 35 U.S.C. 154(b) by 433 days.

(21) Appl. No.: 17/842,581

(22) Filed: Jun. 16, 2022

(65) Prior Publication Data

US 2022/0406485 A1 Dec. 22, 2022

Related U.S. Application Data

(60) Provisional application No. 63/211,498, filed on Jun. 16, 2021.

(51) Int. Cl.
*G21G 4/04* (2006.01)
*G21H 1/10* (2006.01)

(52) U.S. Cl.
CPC ............... *G21G 4/04* (2013.01); *G21H 1/103* (2013.01)

(58) Field of Classification Search
CPC ............. G21G 4/04; G21G 4/06; G21H 1/103
USPC ........................................................ 250/496.1
See application file for complete search history.

(56) References Cited

U.S. PATENT DOCUMENTS 3,431,328 A * 3/1969 McFarland .............. G21G 4/04 250/493.1
5,082,617 A * 1/1992 Walter ..................... G21H 1/00 376/901
2021/0391092 A1* 12/2021 Matthews ................ G21G 4/06

* cited by examiner

*Primary Examiner* — Jason L McCormack
(74) *Attorney, Agent, or Firm* — Pillsbury Winthrop Shaw Pittman LLP

(57) ABSTRACT

Provided herein is a method for fabricating a heat source for a radioisotope thermoelectric generator (RTG). The method may include reducing a particle size in a strontium compound by powdering and sieving the strontium compound and/or dissolving the strontium compound into an aqueous solution; mixing the strontium compound with graphite to obtain a strontium-graphite mixture; performing a press to the strontium-graphite mixture; and encapsulating the pressed strontium-graphite mixture into an x-ray shielding to obtain the heat source.

12 Claims, 11 Drawing Sheets

500

FUEL FABRICATION PROCESS FOR RADIOISOTOPE THERMOELECTRIC GENERATORS

CROSS-REFERENCE TO RELATED APPLICATIONS

This application claims priority to and benefit of U.S. Provisional Application No. 63/211,498, filed Jun. 16, 2021, entitled "FUEL FABRICATION PROCESS FOR RADIOISOTOPE THERMOELECTRIC GENERATORS," the contents of which is incorporated herein by reference in its entirety.

BACKGROUND

Description of the Related Art

Radioisotope power systems (RPS) are devices that produce power by harnessing heat from decay of a concentrated mass of radioactive material. Radioisotope heater units (RHU) use this heat directly. Radioisotope thermoelectric generators (RTGs) convert heat produced from radioactive decay into electricity. RTGs are desirable as a compact, always-on, no maintenance source of power without need for refueling over periods of months to decades. The utility of an RPS depends on the availability and characteristics of radioisotopes used to fuel it. In general, the characteristics of plutonium-238 ($^{238}$Pu) are favorable for use as a radioisotope for RPS devices. However, plutonium-238 has a very limited supply, making plutonium-238 impractical for most applications. Alternatives radioisotopes for RPS devices include beta emitting radioisotopes (e.g., strontium-90 ($^{90}$Sr), which have been used for RPSs in the past, but which are not optimal because of the need for heavy radiation shielding. RTGs are established devices used since the 1960s in applications where their specialized capabilities warranted their cost premium, such as for military purposes, space probes, etc. Previous versions of RTGs were used in scenarios (e.g., space probes) where minimal or no maintenance or human intervention was needed. These RTGs generally produced a few hundred watts or less of power, operated for relatively short durations of time, and/or were designs customized for a specific use. The fuel form and configuration of previous versions of RTGs were determined based on the radioisotope to be used and the application of the RTG. Many past RTG designs consisted of fuel capsules containing large diameter discs of Strontium Titanate ($SrTiO_3$) surrounded by large amounts of dense metals (e.g., lead (Pb)) or concrete.

Strontium-90 decays by beta emission into yttrium-90 ($^{90}$Y), which itself is a beta radiation source. The energy of the two primary beta particles produced by the $^{90}$Sr decay chain are 541 keV and 2,270 keV. The initial strontium-90 half-life is 28.79 years with the yttrium-90 decay being only 64 hours. Yttrium-90 decays into stable zirconium-90 ($^{90}$Z). Beta particles (e.g., electrons or positrons), when slowed by interaction with matter through which they are moving, can produce bremsstrahlung radiation (x-rays). Bremsstrahlung radiation is a process whereby a charged particle, such as an electron, is decelerated, causing electromagnetic radiation (i.e., a photon) to be produced. To satisfy the law of conservation of energy, the energy of the photon will equal the kinetic energy of the charged particle prior to being decelerated minus the charged particle's energy after being decelerated (e.g., $E_\gamma = E(i)_{e-} - E(f)_{e-}$). Interaction with higher atomic number (i.e., Z) materials (e.g., incident with) will cause a larger deceleration, which will increase the average energy of the x-rays. This indicates that lower Z materials are preferable for shielding these particles due to the decreased x-ray production. Like beta particles, the resulting bremsstrahlung x-rays technically have a range of energies up to a maximum energy equal to the maximum energy of the beta particle (assuming that the beta particle is completely stopped in the material). The x-ray energy and intensity can be high enough to require a considerable radiation shield layer to protect humans and the local environment, including nearby equipment.

Historical designs of $^{90}$Sr RTGs performed well for their given tasks. However, the heavy shielding of these RTGs limited their practical applications. Furthermore, previous fabrication processes focused on hot pressing the strontium-based material (or other isotope) alone. Additionally, previous fabrication techniques included obtaining the fuel after it had been separated and purified into larger chunks. Fuel pellets were then created by powdering the asymmetric chunks and hot pressing the powder. While uniformity in the powder was desired, it was not required and the fabrication process could be optimized by creating the fuel pellet from the powder and utilizing any remaining non-uniformity. Still further, previous fabrication processes were not concerned with using graphite in the creation of the final fuel material. These and/or other drawbacks exist.

SUMMARY

The following is a non-exhaustive listing of some aspects of the present techniques. These and other aspects are described in the following disclosure.

Some aspects include a method of fabricating a heat source for a radioisotope thermoelectric generator (RTG), comprising: reducing a particle size in a strontium compound by powdering and sieving the strontium compound and/or dissolving the strontium compound into an aqueous solution; mixing the strontium compound with graphite to obtain a strontium-graphite mixture; performing a press to the strontium-graphite mixture; and encapsulating the pressed strontium-graphite mixture into an x-ray shielding to obtain the heat source.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
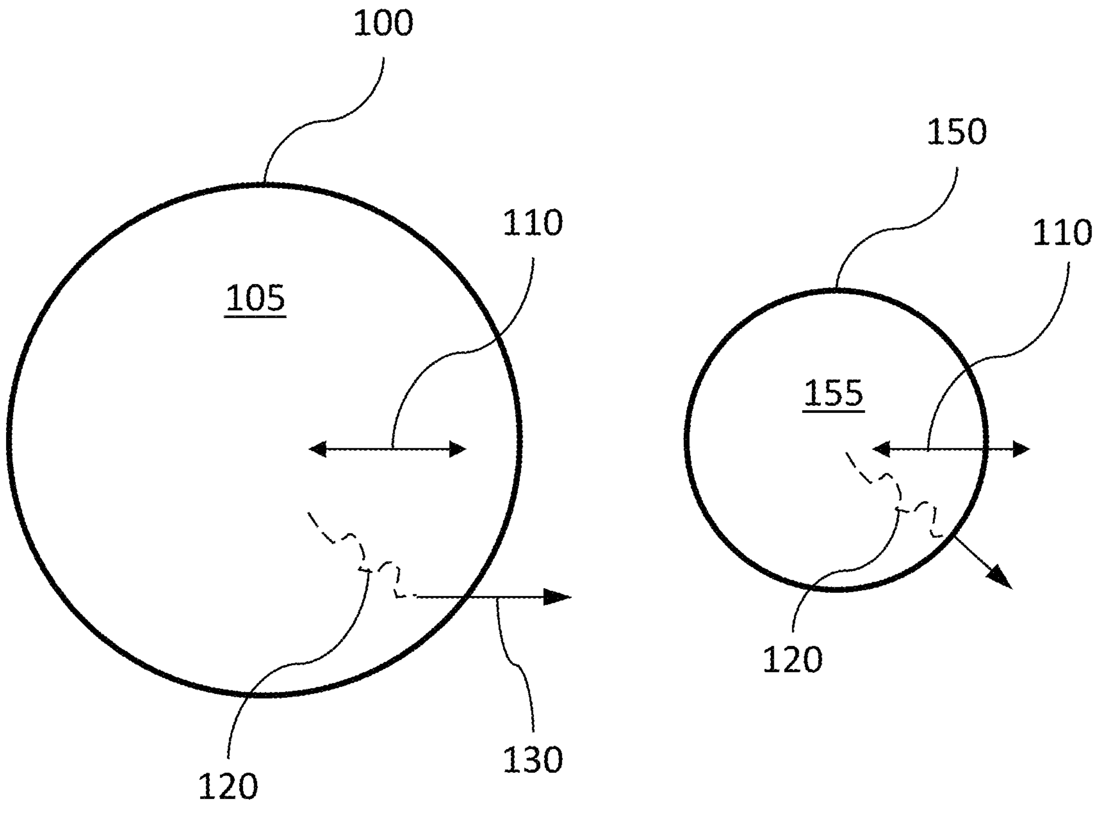
FIG. 1 illustrates an example of a historical fuel design geometry for a radioisotope thermoelectric generator (RTG) and an optimized fuel design geometry for an RTG, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not foreseen) by others in the field of radioisotope thermoelectric generators (RTGs) and fabrication techniques for manufacturing radioactive source materials for RTGs. Indeed, the inventors wish to emphasize the difficulty of recognizing those problems. Further, because multiple problems are addressed, it should be understood that some embodiments are problem-specific, and not all embodiments address every problem with traditional systems described herein or provide every benefit described herein. That said, improvements that solve one or more permutations of these problems and/or other problem(s) are described below.

Power sources including high-energy beta emitting sources may be used to create radioisotope thermoelectric generators (RTGs). RTGs convert heat to electricity, which may then be output from the RTG to power various devices. Such devices may include, for example, batteries, satellites, unmanned facilities, solar panels, communications devices, lighting, motors, etc. The heat may be produced by the decay of a radioactive source material or combinations of different radioactive source materials. The decay process, for example, may include a radioactive element decaying to another element while outputting one or more particles. A radioactive element, as described herein, refers to an element that includes an unstable nuclei, where a number of protons and a number of neutrons in the nucleus is unbalanced. One type of radioactive decay is a beta decay, where an initially unstable atomic element decays to another element (stable or unstable) while outputting an electron or a position. A half-life, $\tau$, of a radioactive element indicates an amount of time for the unstable atomic element to decay to half of its initial value. Each radioactive isotope may have a different half-life, and these half-lives are generally well-known in scientific communities.

In some embodiments, an RTG may be formed that includes strontium-90 as its radioactive element. Strontium-90 includes 38 protons and 52 neutrons (e.g., 38+52=90). Strontium-90 is an unstable strontium (Sr) isotope, having a half-life of 28.9 years. Strontium-90 decays to yttrium-90 via a beta decay, emitting a 546 keV electron. Yttrium-90 includes 39 protons and 51 neutrons (e.g., 39+51=90). Yttrium-90 is an unstable yttrium (Y) isotope, having a half-life of 64.1 hours. Yttrium-90 decays to zirconium-90 via a beta decay, emitting a 2,280.1 keV (2.2801 MeV) electron. While the foregoing description relates generally to radioactive source materials including strontium-90, in some embodiments, RTGs may be formed including other radioactive elements that produce high-energy beta radiation (e.g., beta radiation greater than 2 MeV). For example, strontium-89, plutonium-238, polonium-210, curium-244, or americium-241 are alternative radioisotopes that could be used instead of strontium-90.

RTGs, due to the radioactivity of the materials used, require some form of shielding for safety. Generally speaking, the goal of a shielding design, regardless of use-case, is to reduce the escape of radiation by interposing a material that interacts with that type of radiation to reduce the radiation's energy. One issue with high-energy beta decay is that high energy x-rays result from the initial interaction(s) with shielding materials, and these x-rays can require considerable shielding in turn. Historical designs for shielding resulted in bremsstrahlung being produced before the beta radiation could escape the fuel (e.g., radioactive material) itself. However, fuel designs that reduce/eliminate bremsstrahlung radiation generated within the fuel itself have yet to be fabricated, particularly for larger activity energy sources. The historical fuel designs where bremsstrahlung radiation is produced within the fuel itself have only been possible by limiting the fuel to small amounts of strontium-90 and, even so, surrounding them with unwieldy shields. For instance, current strontium-90 radioactive power source designs use large-radius fuel designs even though it has been known since at least 1968 where virtually all bremsstrahlung x-rays are generated inside the fuel. Therefore, a shielding design that reduced bremsstrahlung radiation generation for large activity beta radiation sources has not been pursued because the x-ray generation had already occurred in the fuel. Consequently, to shield high-energy beta radiation sources and their associated bremsstrahlung x-ray generation required using large masses of heavy metals or concrete that severely constrained the applications (e.g., use cases) of such beta emitting RTGs.

Due to the need for large masses of metals or concrete for shielding, lightweight shielding of high-energy beta radiation sources was not practical for portable, terrestrial, or space use. This has limited the use of beta source RTGs to applications where either higher allowable radiation levels permit use of less shielding or where the large shield mass, volume, and cost are acceptable. A shielding design intended for portable use-cases outside of a remote environment requires the inherent safety mechanisms afforded by large masses of metals or concrete, while also being lightweight enough to be portable. Now, a confluence of factors warrants reassessing use of strontium-90 RTGs. Namely, a lack of alternative radioisotopes where strontium-90 would be in plentiful supply if nuclear fuel is reprocessed and the need for small amounts of unattended, reliable, long-term power to highly energy efficient devices being deployed where humans cannot go. One of the main driving forces in propelling the widespread use of RTGs is reducing the x-ray shield cost and weight.

Additionally, manufacturing the fuel material for RTGs, such as those described above, requires development of unique set fabrication steps to ensure that the fuel material will have the appropriate density, size, and uniformity. In particular, the inclusion of graphite in the fuel material requires identifying optimized pressing parameters, as the graphite drives the pressing process, not the fuel as was the case in previous fabrication processes. Furthermore, the parameters for pressing the powdered material are optimized around the fuel design and bremsstrahlung generation to ensure adequate protection from radiation and appropriate power output levels.

Previous techniques for fabricating fuel sources had no need to include graphite, so the fabrication process was not concerned with how including graphite could or would alter the fabrication steps and parameters. For instance, if additional elements were included that increased the volume of the fuel, the volume of heavy metal shielding would subsequently be increased. On the other hand, the inclusion of graphite serves an important function—to minimize the bremsstrahlung radiation. Additionally, previous fuel fabrication processes did not impose the uniformity requirements of the powdered radioactive materials that are required for the fuel sources described herein. For instance, the hot pressing for the fuel sources described herein may use a die that is the shielding itself. Furthermore, the fabrication process described herein utilizes a hot cell because, during processing, the fuel may be exposed to or placed near metal that is not graphite until it is in its final form, which can cause very high bremsstrahlung radiation to be generated and, subsequently, produces high radiation exposure during processing.

FIG. 1 illustrates an example of a geometry 100 of a historical fuel design for a radioisotope thermoelectric generator (RTG) and a geometry 150 of an optimized fuel design for an RTG, in accordance with various embodiments. In some embodiments, geometry 150 for an optimized fuel design of an RTG may be crafted such that bremsstrahlung radiation generation may be reduced as compared to geometry 100 for the historical fuel design. For instance, geometry 150 of the optimized fuel design may reduce bremsstrahlung x-ray generation by allowing most high-energy beta radiation to escape from a fuel source. The fuel source of the optimized fuel design, for example, may be a high-energy beta emitter, such as strontium-90.

As seen in FIG. 1, geometry 100 of the historical fuel design may have a radius that is greater than a mean free path 110 of the fuel source's beta radiation. In this example, the electron 120 produced via the beta decay of the radioactive source material is converted to bremsstrahlung radiation 130 (e.g., an x-ray) within the fuel source 105 (e.g., the fuel source of the historical fuel design). However, in some embodiments, geometry 150 of the optimized fuel design may have a radius that is less than the mean free path of the beta radiation, thereby allowing the beta radiation to escape from the fuel source 155 (e.g., the fuel source of optimized fuel design) without first being converted to bremsstrahlung x-rays. After escaping the fuel source (e.g., the fuel source of optimized fuel design), the beta radiation may be decelerated within a material, such as a portion of a shielding, which may inhibit bremsstrahlung radiation generation. The material may be selected based on atomic number (i.e., Z), or effective atomic number, if a compound material. In some cases, the material may be a material with a low-density.

Figure 2:
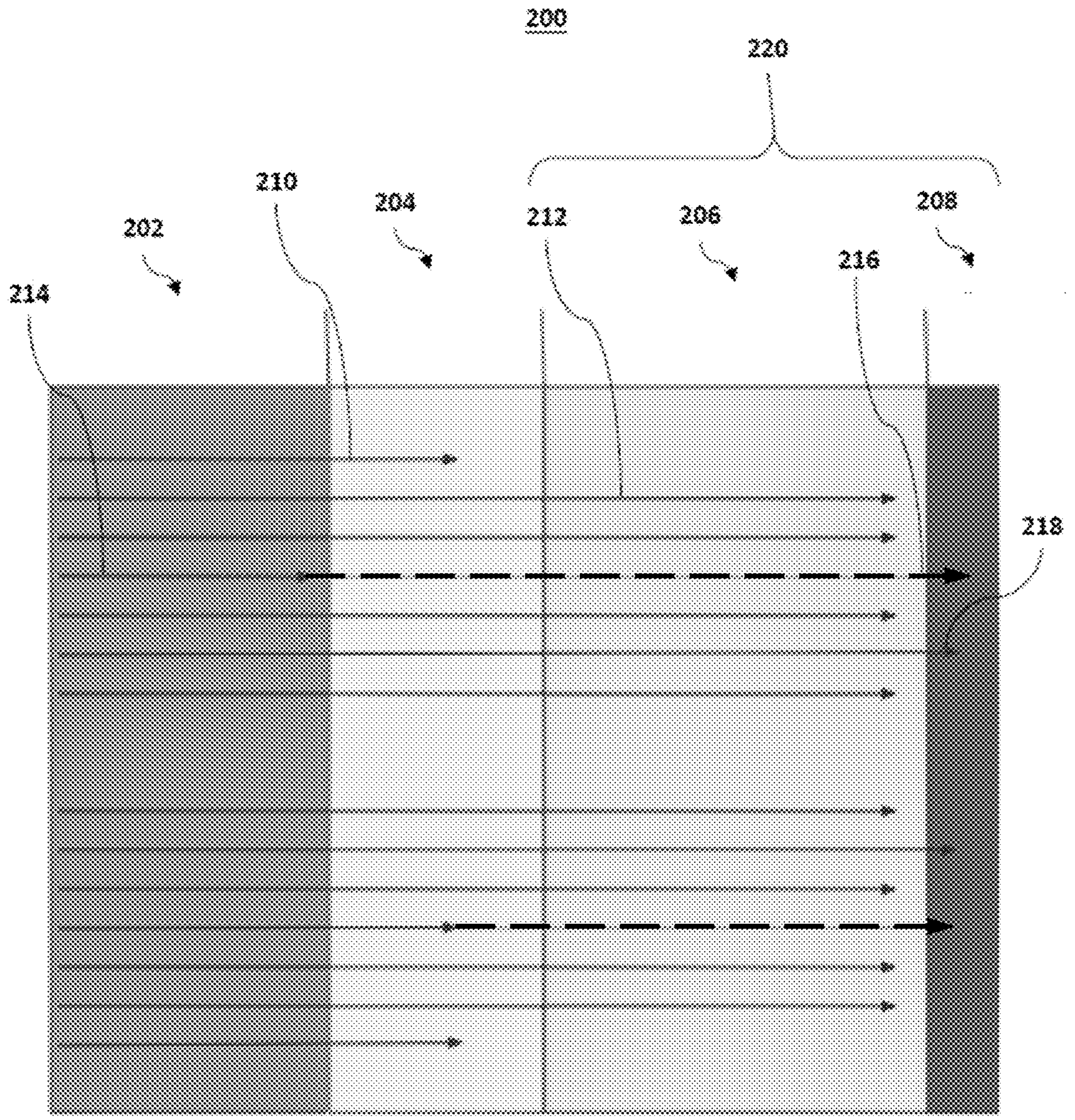
FIG. 2 illustrates an example of a two-phase shielding for an RTG, in accordance with various embodiments.

FIG. 2 illustrates an example of a two-phase shielding 220 for an RTG 200, in accordance with various embodiments. In some embodiments, RTG 200 may include a fuel 202, also referred to herein interchangeably as fuel source 202, a fuel container 204, and a two-phase shielding system 220, also referred to herein interchangeably as two-phase shielding 220, shielding 220, and/or system 220. Two-phase shielding system 220 may include a first shield 206 and a second shield 208. In some embodiments, first shield 206 may be referred to herein interchangeably as primary shield 206, and second shield 208 may be referred to herein interchangeably as secondary shield 208. Additionally, in some embodiments, RTG 200 may not include fuel container 204.

In some embodiments, two-phase shielding 220 may be designed to reduce bremsstrahlung radiation generation, minimize radiation outside RTG 200, and also provide structural stability for RTG 200. In some embodiments, first shield 206 may be formed of a material having a low effective atomic number. First shield 206 may be configured to attenuate at least some of the bremsstrahlung radiation that escapes fuel 202 and fuel container 204 (e.g., as seen in geometry 150 of FIG. 1). In some embodiments, second shield 208 may be formed of a material having a high effective atomic number. Second shield 208 may be configured to absorb bremsstrahlung radiation that escapes first shield 206 and/or is generated within first shield 206. Second shield 208 may also be configured to provide structural stability and ruggedness for two-phase shielding 220, thus also providing stability and ruggedness for RTG 200. In some embodiments, RTG 200 may be configured to operate at very high temperatures to maximize thermal efficiency. For example, RTG 200 may be configured to operate at, or above, approximately 700 degrees Celsius. The temperature ranges for which RTG 200 may operate may range from approximately 50 degrees Celsius to the degradation temperature of the fuel (e.g., approximately 1400 degrees Celsius for $SrF_2$, 1800 degrees Celsius for $SrTiO_3$). In some embodiments, RTG 200 may be configured to operate at low temperatures to simplify the thermal design and handling. Regardless, the geometry 150 can support a wide range of possible operating temperatures to best suit the application. In some embodiments, first shield 206 may serve to attenuate as much bremsstrahlung radiation as possible that escaped from fuel 202, or fuel 202 and fuel container 204. Additionally, first shield 206 may be designed to produce a minimal amount of bremsstrahlung radiation. In some embodiments, first shield 206 must be configured to act as a heat transfer medium to transfer heat between a heat source and a heat sink. First shield 206 may be formed of one or more materials. For example, first shield 206 may be formed of graphite, lithium hydride, hydrogenous oils or resins, molten salts, and the like. The one or more materials used to form first shield 206 may include materials having a low density, a low atomic number, high thermal conductivity, and/or high material degradation temperature, and may additionally or alternatively be a material that is compatible with a material (e.g., strontium titanate) including the radiation source to be used (e.g., strontium-90).

In some embodiments, graphite may be selected as a material to be used for first shield 206 because graphite has a good thermal conductivity and a low effective atomic number of 6. Additionally, graphite has high chemical compatibility with other materials and has been used as a material compatibility buffer in previous RTG designs. The melting temperature of graphite is higher (e.g., 3,600 degrees Celsius) than a melting temperature of strontium titanate (e.g., 2,080 degrees Celsius), making it thermally stable. Graphite is also not toxic, relatively inexpensive, and is used for many existing nuclear applications.

In some embodiments, lithium hydride or hydrogenous oils may be selected as a material to be used for first shield 206 because of their low densities, acceptable thermal conductivity, and low effective atomic numbers. For example, lithium hydride has an effective atomic number of 1.5, while hydrogenous oil will be generally higher and dependent on the specific oil used. Both substances may be compatible with the other materials in the fuel design, though lithium hydride is toxic and chemically reactive, which may increase manufacturing cost and increase risks in the event of a loss of containment. While hydrogenous oils are relatively inexpensive, lithium hydride is not. In some cases, the maximum temperature before degradation or boiling of both lithium hydride and hydrogenous oils can limit the operating temperature of the fuel design. For example, lithium hydride and hydrogenous oils can cause the operating temperature of RTG 200 to be below 700 degrees Celsius.

In some embodiments, a molten salt option, such as FLiBe ($Li_2BeF_4$), may be selected as a material to be used for first shield 206. The effective atomic number of the molten salt option is 3.3, representing a bremsstrahlung intensity reduction of approximately 87% compared to past strontium-90 designs. The density of the molten salt option is approximately 1.9 g/cm$^3$. The molten salt option has an acceptable thermal conductivity and can be made relatively inexpensively. Molten salts can be used as high temperature heat transfer medium for certain applications, such as, for example, central solar power stations, and has been planned for use in nuclear reactors.

In some embodiments, a refractory compound such as boron nitride (BN) or boron carbide ($B_4C$) may be selected as a material to be used for first shield 206. The effective atomic number of the refractory compounds is similar to graphite, representing in a bremsstrahlung intensity reduction similar to that of using graphite. The density of the refractory compound option is approximately 2.1-2.5 g/cm$^3$. The refractory compound option has an acceptable thermal conductivity and can be made relatively inexpensively. Refractory compounds have high thermal and chemical stability and high hardness to resist damage from impacts.

In some embodiments, a thickness and material for second shield 208 are chosen to reduce remaining beta rays that escape first shield 206 to low enough values to allow handling and use. Second shield 208 may be configured to stop or absorb most bremsstrahlung radiation that may have been produced by fuel 202, fuel container 204, and/or primary shield 206 that was not attenuated by fuel container 204 or first shield 206. Second shield 208 may be formed of one or more materials, which may differ from the one or more materials of first shield 206. For instance, the one or more materials used to form second shield 208 may include materials having a high density, a high effective atomic number, high thermal conductivity, high material degradation temperature, as well as being a material that is compatible with other materials in RTG 200. As an example, second shield 208 may be formed of tungsten, lead, depleted uranium, a combination thereof, or other materials. In some embodiments, combinations of tungsten, lead, and/or depleted uranium may be used to control heat transfer.

In some embodiments, an electron 210 produced as a result of a radioactive decay (e.g., a beta decay) of a radioactive substance (e.g., strontium-90) within fuel 202 may escape fuel 202 and be attenuated in fuel container 204. For instance, a radius of fuel 202 may be less than a mean free path of electron 210, allowing electron 210 to escape fuel 202 without being converted into bremsstrahlung radiation. In some embodiments, an electron 212 produced as a result of a radioactive decay (e.g., a beta decay) of a radioactive substance (e.g., strontium-90) within fuel 202 may escape fuel 202, pass through fuel container 204, and may be attenuated in first shield 206. In some embodiments, an electron 214 produced as a result of a radioactive decay (e.g., a beta decay) of a radioactive substance (e.g., strontium-90) within fuel 202 may not escape fuel 202, and may be converted into bremsstrahlung radiation (e.g., an x-ray) 216. Bremsstrahlung radiation 216 may escape fuel 202, pass through fuel container 204 and first shield 206, and may be attenuated by second shield 208. In some embodiments, an electron 218 produced as a result of a radioactive decay (e.g., a beta decay) of a radioactive substance (e.g., strontium-90) within fuel 202 may escape fuel 202, pass through fuel container 204 and first shield 206, and may be attenuated by second shield 208. Alternatively, an electron produced as a result of a radioactive decay (e.g., a beta decay) of a radioactive substance (e.g., strontium-90) within fuel 202 may escape fuel 202, and be converted to bremsstrahlung radiation within fuel container 204, first shield 206, or second shield 208. Regardless of whether the bremsstrahlung radiation was produced within fuel container 204, first shield 206, or second shield 208, the bremsstrahlung radiation may be attenuated prior to arriving at, or by, second shield 208 so as to not escape RTG 200.

Many nuclear fuel designs may be contained in multiple levels of containment structures as an inherent safety element. However, some prior designs for fuel capsules included a single layer of containment. Some embodiments include a graduated containment structure to increase safety of the fuel design by reducing radiation exposure and loss of fuel containment if the shield is punctured or the containment is lost in some other way. Additionally, the graduated containment structure may provide lightweight attenuation for any bremsstrahlung radiation that is generated. In some embodiments, the graduated shielding may include geometric combinations making use of self-shielding, sectioning off of fuel into separate compartments, containing fuel such that the spread of fuel is limited if the shielding is impacted, and geometric designs that reduce radiation exposure under off-normal conditions.

In some embodiments, fuel designs are described herein for a high-energy beta radiation emitter, such as strontium-90. As an example, the range (e.g., a mean-free path) of electrons in strontium titanate ($SrTiO_3$) may be approximately 2 mm. An electron produced within a strontium titanate source therefore could be stopped in approximately 2 mm of strontium titanate source material.

Figure 3:
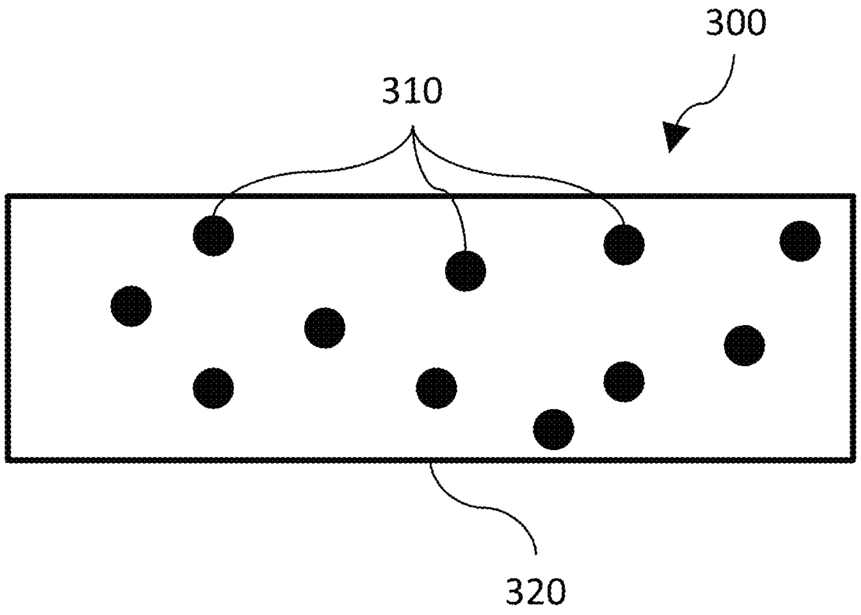
FIG. 3 illustrates an example of a dispersed fuel design for an RTG, in accordance with various embodiments.

FIG. 3 illustrates an example of a dispersed fuel design 300 for an RTG, in accordance with various embodiments. In some embodiments, fuel design 300 may include dispersed spherical structures 310 formed of the high-energy beta radiation emitter. The spherical structures may be (i) of a substantially same size and (ii) substantially spherical. For instance, a volume V of each sphere may be equal to $4/3\pi r^3$, where "r" corresponds to a radius of a given spherical structure. Each spherical structure's volume may be within a predetermined tolerance level. For example, each spherical structure may have a volume V that within N standard deviations $\sigma$ of an average spherical structure volume, where, for example, N can be any number such as 1, 2, etc. Spherical structures having a volume greater than $V+N\sigma$ or less than $V-N\sigma$ may be excluded from fuel design 300.

Furthermore, each spherical structure may have a radius, r, that is substantially constant throughout its volume.

In some embodiments, each spherical structure may have a radius that is equal to or less than 2 mm, corresponding to a range of electrons produced by a beta decay of strontium-90. In some embodiments, each spherical structure may be formed of strontium titanate and may be coated with graphite 320. In some embodiments, the spherical structures may be dispersed in the primary shield (e.g., first shield 206) and may also be sintered or hot pressed together and encased in the secondary shield (e.g., second shield 208). In other embodiments, the dispersed structures may be other shapes such as polyhedral or irregular, but having a characteristic size, surface area, or volume commensurate with the exemplary spherical structures as described herein.

Figure 4:
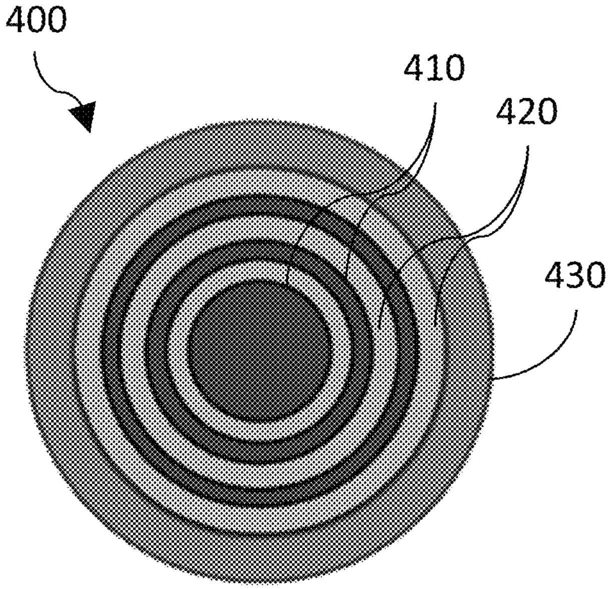
FIG. 4 illustrates an example of a concentric fuel design for an RTG, in accordance with various embodiments.

FIG. 4 illustrates an example of a concentric fuel design 400 for an RTG, in accordance with various embodiments. In some embodiments, concentric fuel design 400 may include concentric cylinders of a high-energy beta radiation emitter 410 having a thickness less than the mean free path of the high-energy beta radiation emitter. For example, concentric fuel design 400 may include concentric cylinders of strontium titanate having a thickness of 2 mm. In some embodiments, concentric fuel design 400 may further include concentric cylinders of a first shielding material 420, such as graphite. For example, concentric fuel design 400 may include a first cylinder of strontium titanate having a first radius, encased by a cylinder of graphite having a thickness, encased by another cylinder of strontium titanate, encased by another cylinder of graphite, and so on. In some embodiments, the first radius may be less than 2 mm (e.g., the mean free path of electrons emitted by strontium titanate). In some embodiments, the thickness of the cylinder of graphite may be 7 mm or less. In some embodiments, an average distance between particles of strontium-90 may be approximately 0.005 cm. The number of cylinders of the radioactive source material and the number of cylinders of the first shielding material may vary and may depend on the power output a given fuel design is to produce. For example, the number of cylinders may be 6 or more (e.g., 3 cylinders of strontium titanate and 3 cylinders of graphite), 10 or more (e.g., 5 cylinders of strontium titanate and 5 cylinders of graphite), etc. In some embodiments, the concentric cylinders of the high-energy beta radiation emitter (e.g., strontium titanate) and the first shielding material (e.g., graphite) may be encased in a second shielding material 430, such as tungsten. The thickness may be selected such that radiation exposure from the RTG will be less than a threshold amount of radiation exposure (e.g., less than 10 mrem/hr at 1 meter away).

Figure 5A:
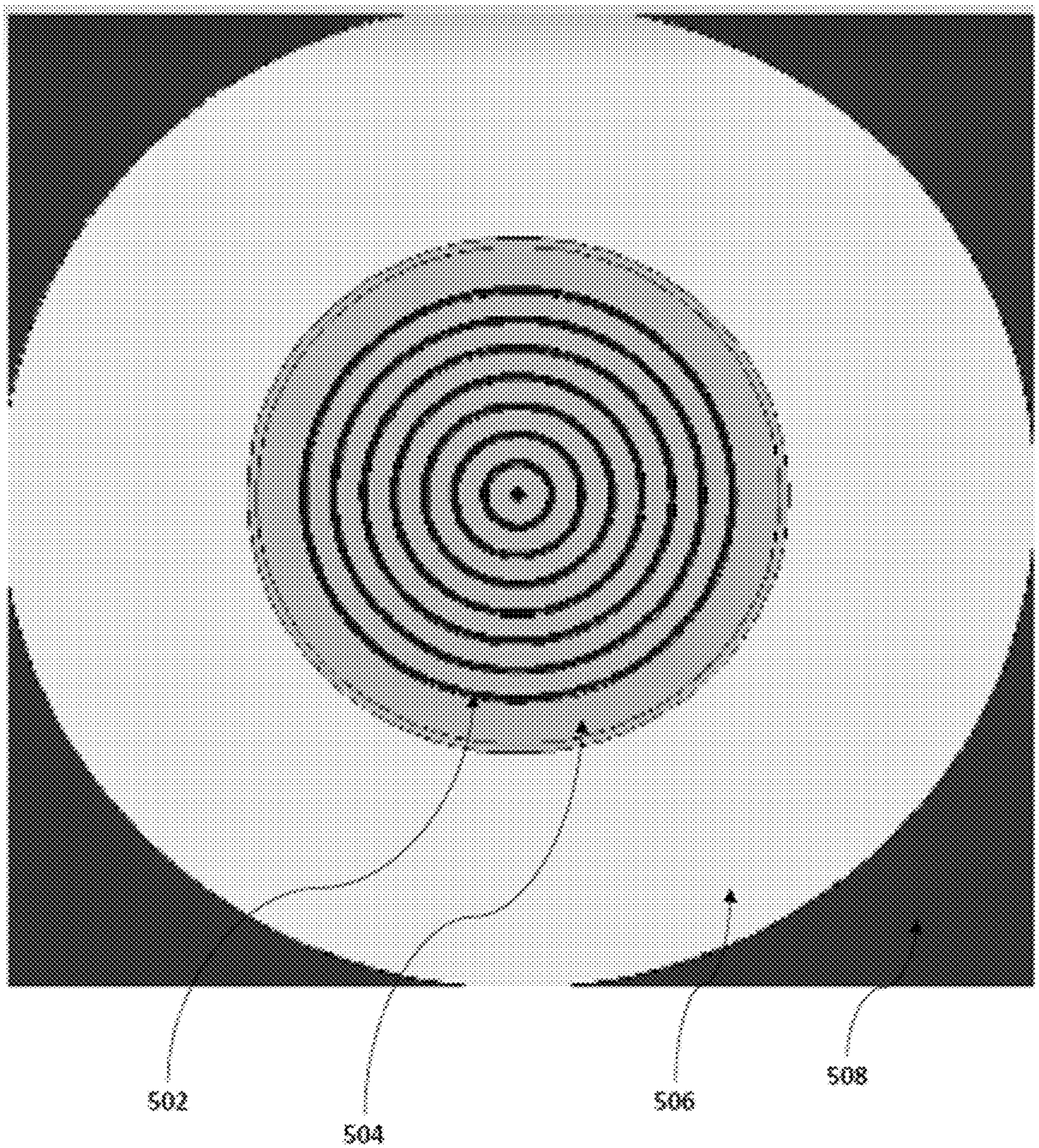
FIG. 5A illustrates another example of a concentric fuel design for an RTG, in accordance with various embodiments.
Figure 5B:
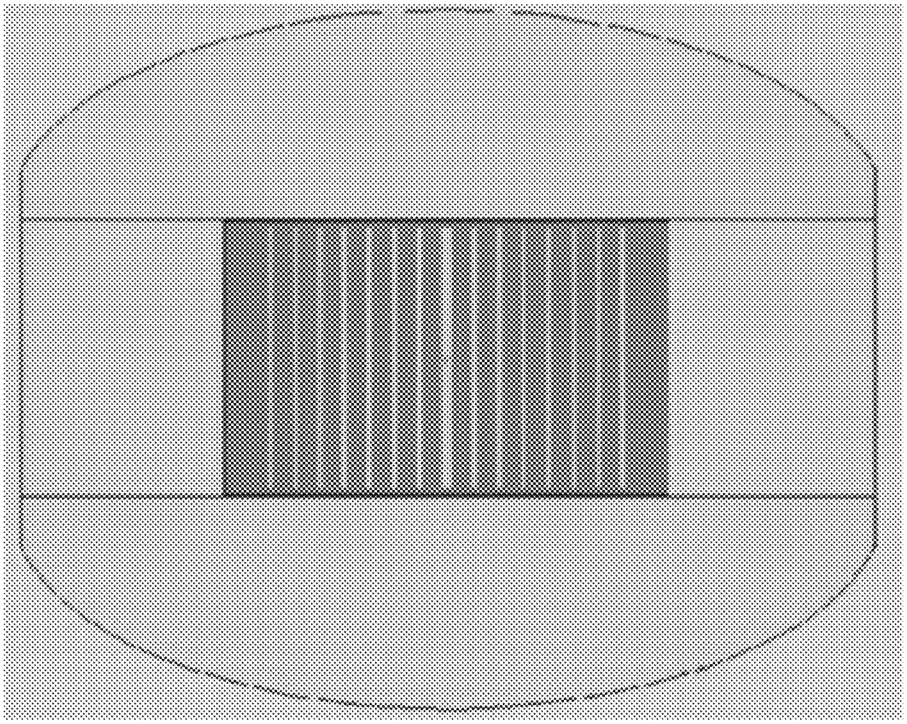
FIGS. 5B and 5C illustrate a side view and a top view, respectively of an example of a concentric fuel design for an RTG, in accordance with various embodiments.
Figure 5C:
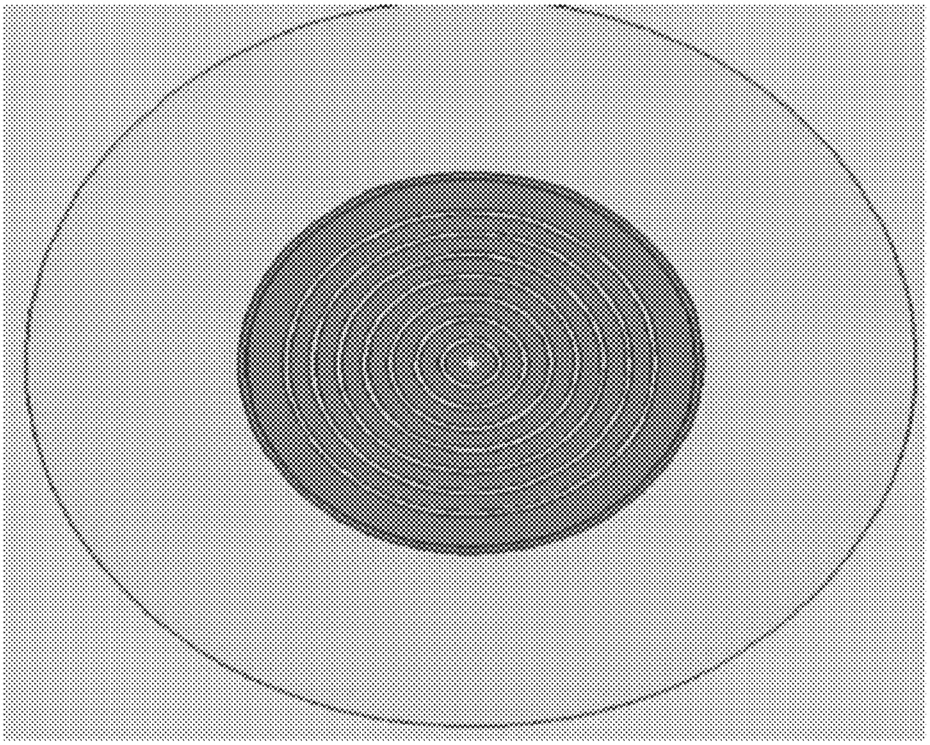

FIG. 5A illustrates another example of a concentric fuel design 500 for an RTG, in accordance with various embodiments. FIGS. 5B and 5C illustrate a side view and a top view, respectively, of an example of a concentric fuel design for RTG 500, in accordance with various embodiments. In some embodiments, concentric fuel design 500 may be similar to concentric fuel design 400 of FIG. 4, and the previous description may apply. Concentric fuel design 500 may include first concentric cylinders 502 of a high-energy beta emitter, such a strontium-90. For example, first concentric cylinders 502 may be formed of strontium titanate. First concentric cylinders 502 may be interposed with second concentric cylinders 504. Second concentric cylinders 504 may, in some embodiments, form a first, or primary, shield. For example, second concentric cylinders 504 may be similar to first shield 206 of FIG. 2. In some embodiments, second concentric cylinders 504 may be formed of one or more materials having a low density, a low atomic number, high thermal conductivity, high material degradation temperature, as well as being a material that is compatible with the radiation source to be used (e.g., strontium-90). For example, second concentric cylinders 504 may be formed of graphite.

In some embodiments, a central cylinder of first concentric cylinders 502 may be surrounded by a first instance of second concentric cylinders 504. The first instance of second concentric cylinder 504 may be sandwiched between a first instance of first concentric cylinder 502. This alternating pattern of first concentric cylinders 502 and second concentric cylinders 504 may be repeated a number of times depending on the power requirements of the RTG. However, an outer cylinder of fuel design 500 will be formed of second concentric cylinder 504. In some embodiments, a thickness of each concentric cylinder 502 and 504 may be substantially similar. For example, concentric cylinders 502 and 504 may both have a thickness that is equal to or less than 1 mm, 1.5 mm, 2 mm, 2.5 mm, 3 mm, etc. As another example, concentric cylinders 502 and 504 may both have a same thickness in a range of 1-10 mm. In some embodiments, a thickness of each concentric cylinders 502 may be substantially similar to one another, and a thickness of each concentric cylinder 504 may be substantially similar to one another but different than that of concentric cylinders 502. For example, concentric cylinders 502 and 504 may each have a thickness that is equal to or less than one of 1 mm, 1.5 mm, 2 mm, 2.5 mm, 3 mm, etc. As another example, concentric cylinders 502 and 504 may each have a thickness in a range of 1-10 mm. In some embodiments, a radius of each concentric cylinder 502 and each concentric cylinder 504 may increase as the number of cylinders increases (e.g., an inner cylinder may have a smaller radius than an outer cylinder). For example, a first concentric cylinder 502 may have a first radius, and first concentric cylinder 502 may be surrounded by a first concentric cylinder 504 having a second radius that is greater than the first radius. First concentric cylinder 504 may be surrounded by a second concentric cylinder 502 having a third radius that is greater than the second radius, and so on. The radius may gradually increase, for example, starting at 2 mm. The second radius may be one selected in a range of 2-4 mm, 2.5-4.5 mm, 2-6 mm, etc., and the third radius may be selected in a range of 4-6 mm, 4.5-6.5 mm, 4-7 mm, etc.

In some embodiments, third cylinder 506 may surround concentric cylinders 502 and 504. Third cylinder 506 may be substantially similar to second shield 208 of FIG. 2, and the previous description may apply. In some embodiments, third cylinder 506 may be formed of one or more materials with high density, high effective atomic number, high thermal conductivity, high material degradation temperature, as well as being a material that is compatible with other materials in the RTG. For example, third cylinder 506 may be formed of tungsten. In some embodiments, a thickness of third cylinder 506 may be dependent on design requirements of the RTG (e.g., power requirements, number of instances of first shield, material composition, etc.). In some embodiments, third cylinder 506 may be encompassed by a layer 508 of air, or may be exposed to the natural environment.

Figure 6A:
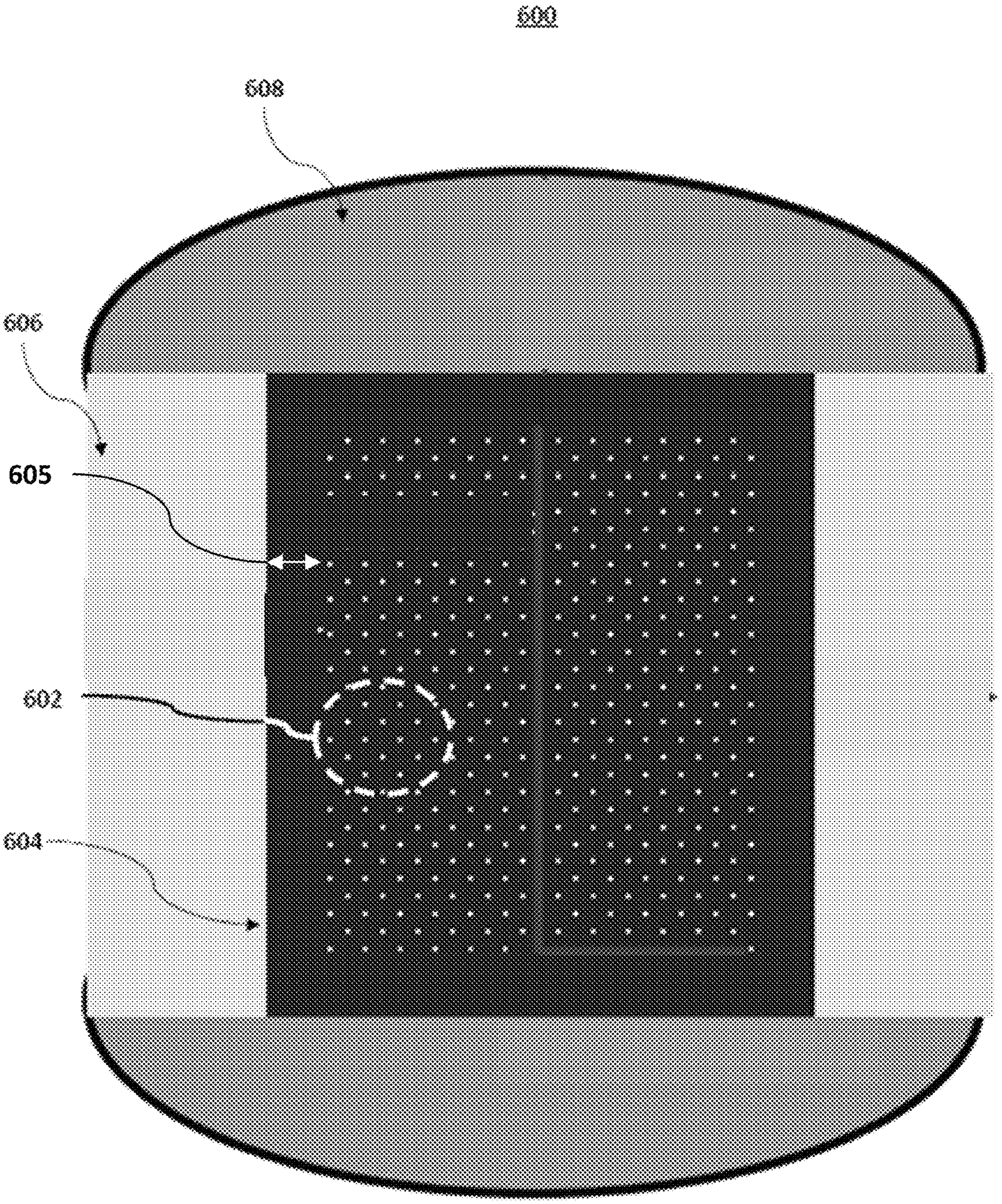
FIG. 6A illustrates another example of a dispersed fuel design for an RTG, in accordance with various embodiments.
Figure 6B:
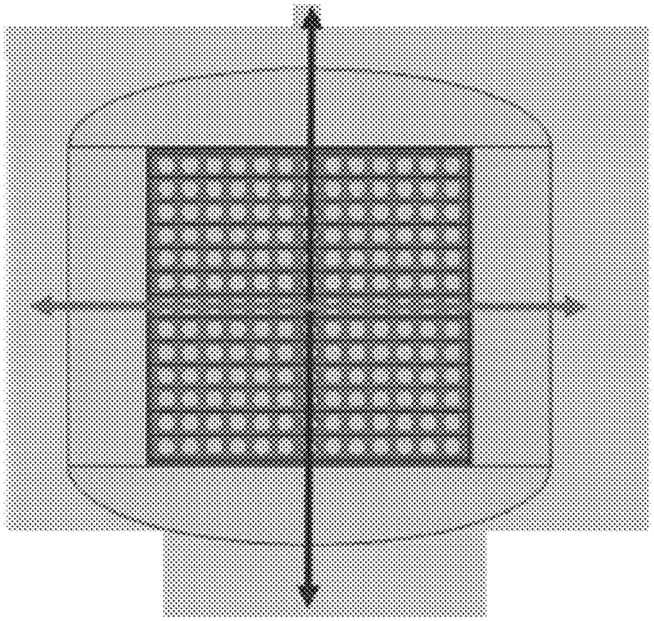
FIGS. 6B and 6C illustrate a side view and a top view, respectively, of an example of a dispersed fuel design for an RTG, in accordance with various embodiments.
Figure 6C:
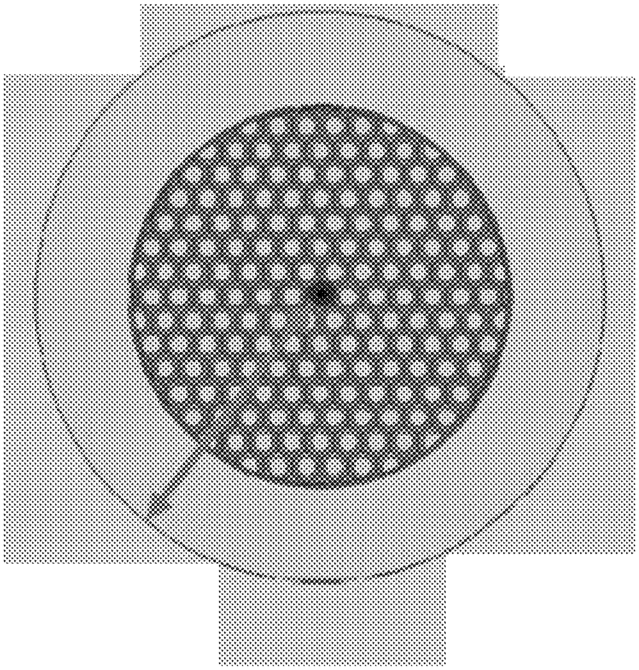

FIG. 6A illustrates another example of a dispersed fuel design for an RTG 600, in accordance with various embodiments. FIGS. 6B and 6C illustrate a side view and a top view, respectively, of an example of a dispersed fuel design for RTG 600, in accordance with various embodiments RTG 600 may include dispersed spherical structures 602 formed of the high-energy beta radiation emitter. The spherical structures may be (i) of a substantially similar size and (ii) substantially spherical. For example, the spherical structures may be the same or similar to the spherical structures described above with references to FIG. 3. In some embodiments, each spherical structure may have a radius that is equal to or less than 2 mm, corresponding to a range of electrons produced by a beta decay of strontium-90. In some embodiments, each spherical structure may be formed of strontium titanate and may be coated with graphite. In some embodiments, the spherical structures may be dispersed in a first shield 604. For example, first shield 604 may be formed of one or more materials having a low density, a low atomic number, high thermal conductivity, and/or high material degradation temperature, and may additionally or alternatively be a material that is compatible with a material (e.g., strontium titanate) including the radiation source to be used (e.g., strontium-90). As an example, first shield 604 may be formed of graphite. In some embodiments, first shield 604 may include a buffer layer between a portion including spherical structures 602, and second shields 606 and 608. The purpose of this buffer layer is to prevent any spherical structures 602 from contacting the second shields 606 and 608 and generating high-intensity bremsstrahlung.

Second shields 606 and 608 may each be formed of one or more materials having a high density, a high effective atomic number, high thermal conductivity, high material degradation temperature, as well as being a material that is compatible with other materials in RTG 200. As an example, second shields 606 and 608 may be formed of tungsten. In some embodiment, second shield 606 may have a first thickness and second shield 608 may have a second thickness. For example, the thickness of second shield 606 may be 5 mm and the thickness of second shield 608 may be 10 mm. Each of second shields 606 and 608 may have a thickness selected from within a range of thickness. The thickness is selected such that radiation exposure from the RTG will be less than a threshold amount of radiation exposure. For example, the thickness of the second shield may be selected such that the radiation exposure is less than 10 mrem/hr at 1 meter away. In some embodiments, second shield 606 may be substantially constant in thickness. For example, second shield 606 may be a sidewall of RTG 600 having a substantially constant thickness (e.g. selected as being a value within a range of 2-10 cm). In some embodiments, second shield 608 may have a varying thickness, whereby the thickness proximate to a perimeter of RTG 600 is less than a thickness along a central axis of RTG 600 (e.g., selected as being a value within a range of 2-10 cm).

Figure 7:
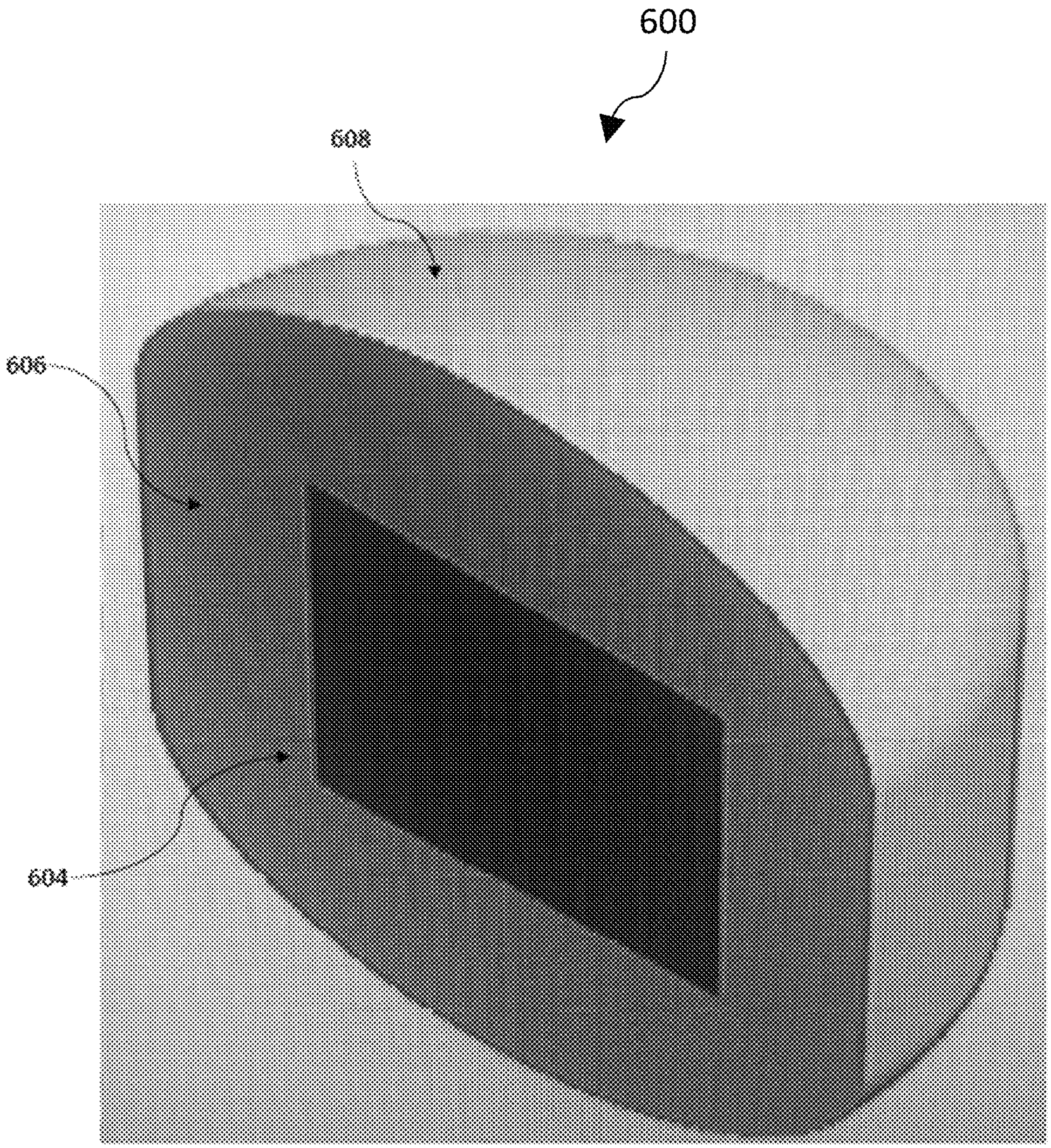
FIG. 7 illustrates an example of a cross-sectional view of a fuel design for an RTG, in accordance with various embodiments.

FIG. 7 illustrates a perspective view of the dispersed fuel design for an RTG of FIG. 6, in accordance with various embodiments. As seen from FIG. 7, RTG 600—described in detail in FIGS. 6A-6C above, is shown. In FIG. 7, a perspective view of RTG 600 is depicted.

Figure 8:
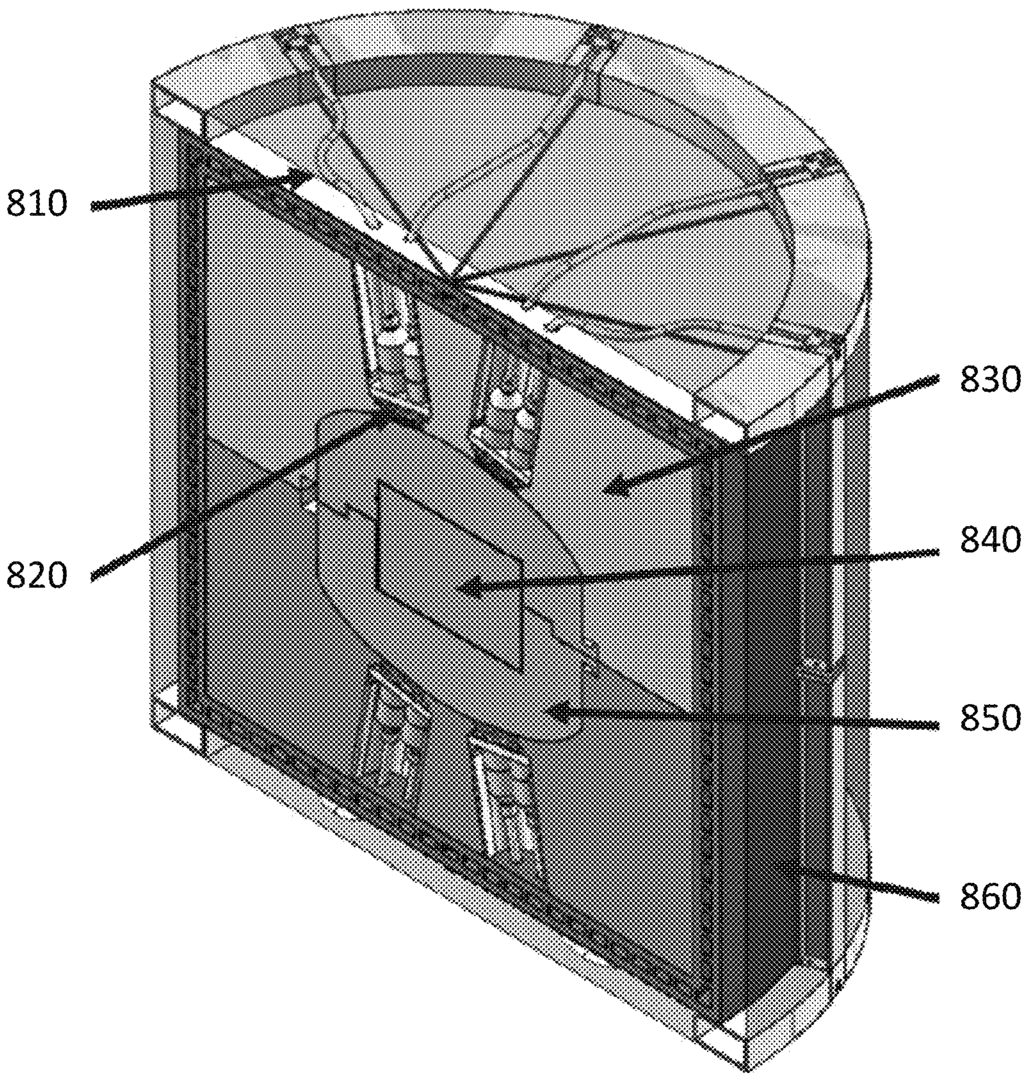
FIG. 8 illustrates another example of a cross-sectional view of a fuel design for an RTG, in accordance with various embodiments.

FIG. 8 illustrates another example of a cross-sectional view of a fuel design for an RTG, in accordance with various embodiments. As seen in FIG. 8, the RTG includes heat pipes 810, thermoelectric 820, insulation 830, fuel (e.g., strontium titanate) and graphite matrix 840, x-ray shielding 850, and a pyrolytic graphite radiative fin 860. In some embodiments, the fuel design of FIG. 8 depicts an example of how the heat source can be incorporated into an RTG designed for space applications.

Figure 9:
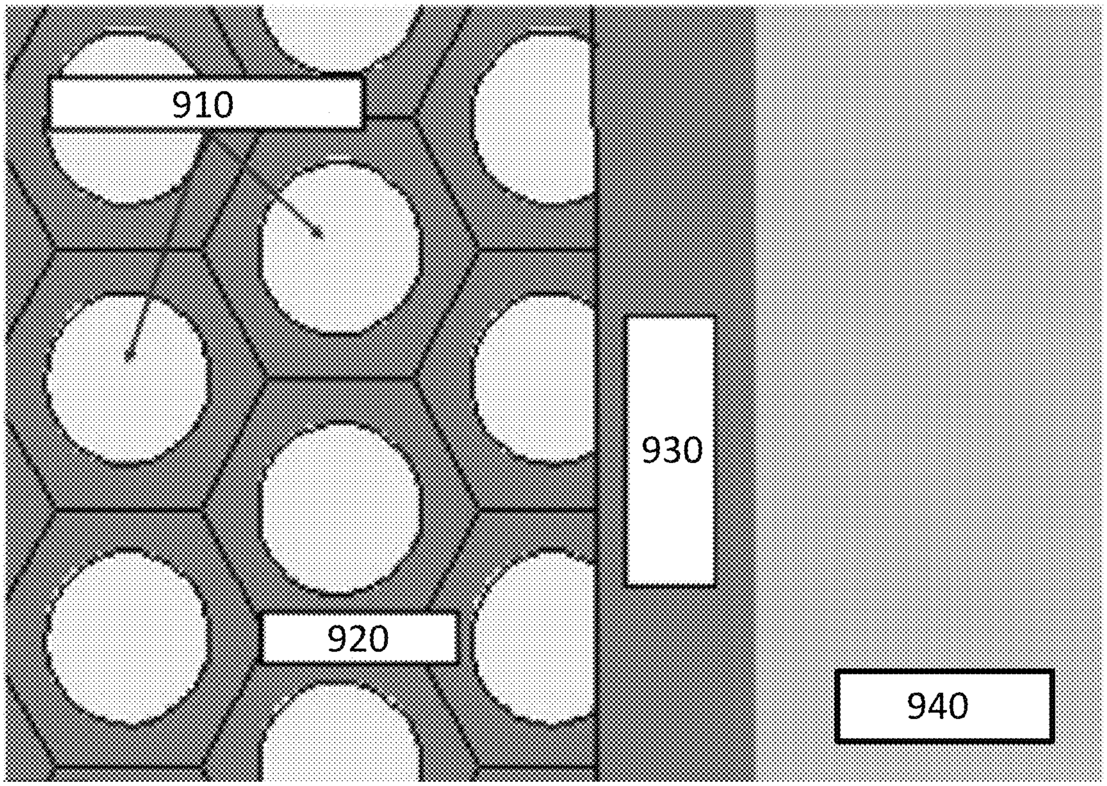
FIG. 9 illustrates an example of a zoomed-in region of an interface of a radioactive source material and shielding of a fuel design for an RTG, in accordance with various embodiments.

FIG. 9 illustrates an example of a zoomed-in region of an interface of a radioactive source material and shielding of a fuel design for an RTG, in accordance with various embodiments. As seen in FIG. 9, strontium titanate particles are encapsulated in graphite, and the graphite and particle combination are dispersed within the fuel. At an edge of the fuel, in some embodiments, may be a graphite beta shield. The graphite beta shield may be sandwiched between the graphite/particle combination and a tungsten layer of shielding. The graphite beta shield can prevent a strontium titanate particle from being directly on the high atomic number, tungsten shield which can result in high-intensity bremsstrahlung generation.

The fabrication process for creating a radioactive source material, such as the radioactive source material described above with reference to FIG. 9, is now described. In some embodiments, the fuel fabrication process relates to a strontium-90 source material, however alternative radioactive isotopes may be used.

Pressure sensitivity studies on a strontium fluoride-graphite mixture of 50 micrometer diameter powders indicate that an appropriate pressure to press the strontium fluoride-graphite mixture to achieve a highest density is, approximately, 30 kilopounds of force per square inch (ksi). Using this pressure, densities of approximately 88-89% of the theoretical maximum density of the strontium fluoride-graphite mixture were obtained. In some embodiments, the mixture ratio is approximately 2.3:1 (e.g., graphite to strontium fluoride). By mass, the density of strontium fluoride is approximately 4.2 g/cc, and the density of graphite is 2.1 g/cc. The density of the strontium fluoride-graphite mixture is approximately 2.6 g/cc. To perform the pressure sensitivity studies, samples of strontium fluoride-graphite mixture were cold isostatically pressed (CIP).

It should be noted that, as described herein, the use of strontium fluoride as a radioactive source material may, alternatively, be replaced with strontium titanate, or other radioactive source materials, and the present disclosure is not intended to be limited to only strontium fluoride. In other embodiments, any titanate-based source disclosure herein may be replaced with fluoride.

Temperature sensitivity studies were also performed on the strontium fluoride-graphite mixture to identify an appropriate temperature to press the strontium fluoride-graphite mixture to achieve a maximum density. The strontium fluoride-graphite mixture, in powder form, was hot isostatically pressed (HIP). The resulting material's density was not analyzed for appropriate temperature due to asymmetric dimensions caused by removing the samples from the can used to perform the HIP. By visual inspection, the appropriate temperature to achieve the best resulting material was determined to be approximately 1200 degrees Celsius.

HIP has also been used to press simulated fuel pellets for an electrically heated RTG prototype. First, CIP was performed to the strontium fluoride-graphite mixtures to improve a resulting net shape. Next, HIP was performed to the resulting CIP-ed mixtures to further increase density. However, this technique was determined to produce samples that were not large enough, and additional prototypes are to be made and tested.

OP and HIP of the strontium fluoride-graphite mixture has been determined to produce suitable densities, however the resulting shape is not of adequate uniformity. Furthermore, the samples required post processing that resulted in a large amount of dust being created, which is not desirable. Hot pressing, instead of HIP, of pellets, or hot pressing directly into the x-ray shielding using the shield as a die, has been determined to be more suitable.

The dimensional discrepancy previously detected may result from a process known as cold sintering. Putting powdered material (having a theoretical density of approximately 64%) under pressure compacts the material and reduces the porosity of the material to achieve densities that are limited to about 90% of theoretical density. Sintering the powdered material induces material changes that can eliminate porosity and potentially reach greater than 99% of theoretical density. However, the sintering temperature of graphite is greater than the melting temperature of $SrTiO_3$ and $SrF_2$. For example, the melting temperature of strontium fluoride is approximately 1477 degrees Celsius, and the melting temperature of strontium titanate is approximate 2080 degrees Celsius. Cold sintering suggests that the sintering temperature of a material can be reduced at high pressures, thereby allowing the materials to densify at lower temperatures. This may explain the dimensional discrepancies if the material reached higher densities than anticipated during the initial pressing steps.

Figure 10:
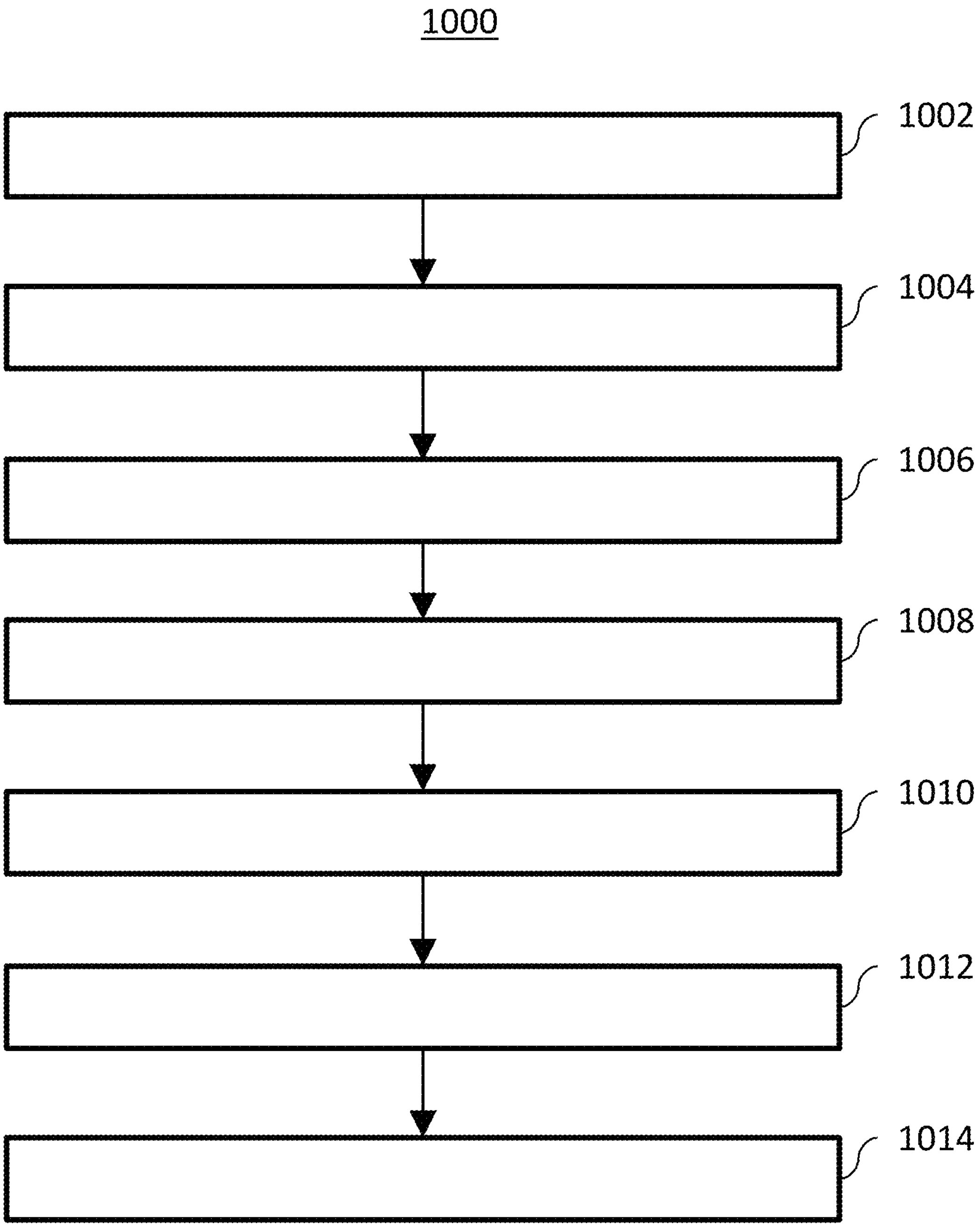
FIG. 10 illustrates an example of a process for fabricating a radioactive source material used for an RTG, in accordance with various embodiments.

FIG. 10 illustrates an example of a process 1000 for manufacturing a radioactive source material used for an RTG, in accordance with various embodiments. In some embodiments, process 1000 may be conducted using a hot cell or a shielded glovebox. Minor alterations may be made to either the hot cell or the shielded glovebox to limit exposure doses to occupational workers. It should be noted that, although the foregoing description relates to a strontium-90 radioisotope as a radioactive source material, alternative radioactive source materials may be used and are not limited to the few potential radioisotopes discussed previously in this disclosure.

In some embodiments, process 1000 may begin at step 1002. At step 1002, a strontium compound (e.g., strontium-90) may be obtained. In some embodiments, the strontium compound may be obtained after impurities have been removed. For example, for stronitium-90, the removed impurities may include the decay product zirconium-90. Removal of the impurities from the source material may function to maximize a specific power of the fuel for the RTG. In some embodiments, the strontium compound (e.g., $^{90}Sr$) may be converted to strontium titanate (e.g., $SrTiO_3$) or strontium fluoride (e.g., $SrF_2$). If waste or contaminated materials remain from the strontium conversion process, they may be disposed of appropriately.

At step 1004, the strontium compound (e.g., $^{90}SrTiO_3$ or $^{90}SrF_2$) may be reduced in particle size. In some embodiments, the strontium compound may be powdered and sieved. In some embodiments, the strontium compound may be powdered using a ball mill. After being powdered, the heterogenous powder may be transferred to a system of sieves to obtain a uniform powder. In some embodiments, the strontium compound (e.g., $^{90}SrTiO_3$ or $^{90}SrF_2$) may be powdered using grinding media in the top of the sieve to grind and sieve at the same time. The powder may be sieved for uniform particle size as well. The size of a radius of each granule of the powders used may be between 15-30 microns, 30-70 microns, 20-60 microns, 40-80 microns, or other ranges. For example, a size of a radius of the granules in the powders used may be 50 micrometers. As another example, a size of a radius of a granule of the powders may be less than 100 microns. Persons of ordinary skill in the art will recognize that the aforementioned dimensions are approximates and some granules may be slightly larger or smaller than others.

As an alternative (or additional) method of particle size reduction, the strontium compound can also be dissolved in aqueous solution . In some embodiments, the strontium compound may be dissolved in an acid, solvent, or other liquid media (e.g., acetone, trichloroethylene, acetic acid, nitric acid, methanol, isopropanol, deionized water, tap water, salt water, or ammonium hydroxide) to decrease powder contamination. The size of a radius of each granule of the particles used may be between 15-30 microns, 30-70 microns, 20-60 microns, 40-80 microns, or other ranges. For example, a size of a radius of the granules in the particles used may be 50 micrometers. As another example, a size of a radius of a granule of the particles may be less than 100 microns. In other embodiments, strontium titanate may be placed in aqueous solution or solvent and mixed to reduce the particle size. For example, $^{90}SrTiO_3$ may be placed in ammonium hydroxide ($NH_4OH$) and allow 10-30 minutes to size reduce with ultra-sonication.

At step 1006, powdered graphite and (in some embodiments porous carbon) may be mixed with the strontium compound (made for example by either/both methods described above in step 1004) to suspend the $^{90}SrTiO_3$ particles in a strontium-graphite mixture (which may be a slurry, if the strontium compound is in aqueous solution). The strontium-graphite mixture may then be heated (e.g., to between 60 and 90 C, optionally to approximately 80 C) and spun (e.g., between 300 and 600 RPM, optionally at approximately 450 RPM) to remove any ammonium hydroxide and return the mixture to a dry powder before pressing. In some embodiments, the strontium-graphite mixture may be mixed with graphite powder of a same or similar granule size as the strontium. The mixing may be performed using a powder mixture device, such as a V-shape mixer, in accordance with a predefined ratio. In some embodiments, the ratio of graphite to strontium may be 2.3:1 (e.g., graphite:$SrF_2$), however other ratios (e.g., 1.9:1, 2:1, etc.) may be used depending on power outputs desired for the RTG, chemical form of the strontium used, or other factors. The ratio used can vary depending on a chemical form of the radioactive source material and a desired power output of the RTG.

At step 1008, the strontium-graphite mixture may be pressed. In some embodiments, the strontium-graphite mixture may be pressed into a "fuel pellet" using a hot press, and subsequently placed into x-ray shielding. The pressing process may include various types of pressing, including, but not limited to, (which is not to imply that other lists are limiting), HIP, CIP then HIP, CIP then hot press, cold press, cold press and sinter, or other forms of pressing. In embodiments where the strontium-graphite mixture/slurry is transferred to a heat loaded die, one example of heating before pressing can include being at 100 degrees C. for 30 minutes, 150 degrees C. for 15 minutes, 200 degrees C. for 15 minutes, and 250 degrees C. for 60 minutes. In some embodiments, when HIP is used to press the strontium-graphite mixture, a pressure of approximately 30 ksi and a temperature of 1200 degrees C. can be used. However, the pressure and temperature may differ from these values. For example, the pressure may be selected from a range of 20-40 ksi, 10-50 ksi, 25-35 ksi, approximately 43 ksi, or other pressure values. As another example, the temperature may be selected from a range of 200-300 degrees C., 1000-1400 degrees C., 1100-1300 degrees C., 1150-1250 degrees C., or other temperatures. In some embodiments, the pressing temperature may be 250 degrees C. Persons of ordinary skill in the art will recognize that additional temperature ranges and pressure ranges may be used. For instance, the temperature and pressure ranges may depend on the chemical form of the radioactive source material (e.g., strontium titanate), and other materials (e.g., graphite), that are used. As an example, boron nitride or boron carbide, which has a similar effective atomic number as graphite, may have different characteristic temperatures and pressures. Additionally, an additive or binder (e.g. sugar, stearic acid, polycaprolactone, or propylene carbonate) may be added to the mixture to increase pellet density after decomposition during pellet pressing.

At step 1010, the pressed mixture may be encapsulated. In some embodiments, the pressed mixture may be encapsulated into the x-ray shielding and secured to a leak tight fit.

At step 1012, one or more tests may be performed to the encapsulated mixture. In some embodiments, the test may include measuring a radiation dose rate at various distances from the heat source. For example, the radiation dose rate at the surface of the encapsulated mixture, at one meter away, at 10 meters away, etc., may be measured. In some embodiments, the measured radiation dose rate may be compared to a threshold radiation dose rate for each distance to determine whether the measured radiation dose rate is greater than the threshold radiation dose rate. For example, to satisfy safety requirements, the radiation dose rate at the surface of the heat source should be less than 200 mrem/hr and less than 10 mrem/hr at 1 meter from the surface. The surface, as described herein, refers to a portion of the fuel source that could be contacted or touched. If so, then a new heat source may be needed and the one tested may not be used. In some embodiments, the heat output of the heat source may be measured. The heat output may be compared to a threshold heat output to determine whether the measured heat output is greater than the threshold heat output. If so, then a new heat source may be needed and the one tested may not be used. In some embodiments, a leak testing may be conducted to confirm whether the heat source is sealed.

At step 1014, any process losses may be disposed of in accordance with known safety protocols. For example, the process losses may be disposed of as LLW using standard procedures.

In some embodiments, the fuel designs described herein may be used for a variety of applications including, but not limited to, heater units for space environments, heater units for cold environments, thermal power sources for energy conversion, medical radioisotope storage shielding, spent nuclear fuel transportation shielding, medical radioisotope transportation shielding, spent nuclear fuel shielding, emergency radiation containment, biological radiation protection for space environments, and biological radiation protection for emergency radiation environments.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A method of fabricating a heat source for a radioisotope thermoelectric generator (RTG), comprising: reducing a particle size in a strontium compound by powdering and sieving the strontium compound and/or dissolving the strontium compound into an aqueous solution; mixing the strontium compound with graphite to obtain a strontium-graphite mixture; performing a press to the strontium-graphite mixture; and encapsulating the pressed strontium-graphite mixture into an x-ray shielding to obtain the heat source.
2. The method of embodiment 1, wherein the strontium compound comprises a strontium-90 compound.
3. The method of any one of embodiments 1-2, further comprising: performing one or more tests to the heat source, wherein the one or more tests include at least one of: measuring a radiation dose rate of the heat source at one or more distances from the heat source; or measuring a heat output of the heat source.
4. The method of embodiment 3, wherein the one or more distances include at least one of: a surface of the heat source, a meter from the surface of the heat source, 10 meters from the surface of the heat source.
5. The method of any one of embodiments 1-4, wherein impurities are removed from the strontium compound prior to the strontium compound being obtained.
6. The method of embodiment 5, wherein the removed impurities include zirconium-90.
7. The method of any one of embodiments 1-6, wherein powdering and sieving the strontium compound comprises: powdering the strontium compound using a ball mill to obtain a heterogenous powder; and sieving the heterogenous powder using a system of sieves to obtain a uniform powder.
8. The method of embodiment 7, wherein a size of a radius of a granule of the uniform powder is approximately 50 micrometers in diameter.
9. The method of any one of embodiments 1-8, wherein powdering and sieving the strontium compound comprises: powdering the strontium compound using grinding media on top of a sieve such that the strontium compound is ground and sieved together.
10. The method of any one of embodiments 1-9, wherein the strontium compound is dissolved in an acid or solvent.
11. The method of any one of embodiments 1-10, wherein the sieved strontium is mixed with graphite at a predefined ratio.
12. The method of embodiment 11, wherein the predefined ratio is 2.3:1 of graphite to the converted strontium compound.
13. The method of any one of embodiments 1-12, wherein the press that is performed comprises at least one of: hot pressing, hot isostatically pressing (HIP), cold isostatically pressing (CIP) followed by HIP, CIP followed by hot pressing, cold press, or cold press and sinter.
14. The method of embodiment 13, wherein HIP is performed using a pressure of 30 ksi and a temperature of 1200 degrees Celsius.
15. The method of any one of embodiments 1-14, further comprising: disposing process losses.
16. A radioisotope thermoelectric generator (RTG) comprising a heat source fabricated using the method of any one of embodiments 1-15.

What is claimed is:

1. A method of fabricating a heat source for a radioisotope thermoelectric generator (RTG), comprising:

reducing a particle size in a strontium compound by powdering and sieving the strontium compound and/or dissolving the strontium compound into an aqueous solution;

mixing the strontium compound with graphite to obtain a strontium-graphite mixture;

performing a press to the strontium-graphite mixture; and encapsulating the pressed strontium-graphite mixture into an x-ray shielding to obtain the heat source.

2. The method of claim 1, wherein the strontium compound comprises a strontium-90 compound.

3. The method of claim 1, further comprising:

performing one or more tests to the heat source, wherein the one or more tests include at least one of:

measuring a radiation dose rate of the heat source at one or more distances from the heat source; or measuring a heat output of the heat source.

4. The method of claim 3, wherein the one or more distances include at least one of: a surface of the heat source, a meter from the surface of the heat source, or 10 meters from the surface of the heat source.

5. The method of claim 1, wherein powdering and sieving the strontium compound comprises:

powdering the strontium compound using a ball mill to obtain a heterogenous powder; and sieving the heterogenous powder using a system of sieves to obtain a uniform powder.

6. The method of claim 5, wherein a size of a granule of the uniform powder is approximately 50 micrometers in diameter.

7. The method of claim 1, wherein powdering and sieving the strontium compound comprises:

powdering the strontium compound using grinding media on top of a sieve such that the strontium compound is ground and sieved together.

8. The method of claim 1, wherein the strontium compound is dissolved in an acid or solvent.

9. The method of claim 1, wherein the sieved strontium is mixed with graphite at a predefined ratio.

10. The method of claim 9, wherein the predefined ratio is 2.3:1 of graphite to the strontium compound.

11. The method of claim 1, wherein the press that is performed comprises at least one of: hot pressing, hot isostatically pressing (HIP), cold isostatically pressing (CIP) followed by HIP, CIP followed by hot pressing, cold press, or cold press and sinter.

12. The method of claim 11, wherein HIP is performed using a pressure of 30 ksi and a temperature of 1200 degrees Celsius.

* * * * *